ns Patent [19]

Byström et al.

[11] Patent Number: 4,898,054
[45] Date of Patent: Feb. 6, 1990

[54] TOOL FOR CHIP REMOVING MACHINING

[75] Inventors: Olof L. Byström, Sandviken; Sven-Erik V. Johansson, Gävle, both of Sweden

[73] Assignee: Sandvik AB, Sandviken, Sweden

[21] Appl. No.: 251,014

[22] Filed: Sep. 27, 1988

Related U.S. Application Data

[63] Continuation of Ser. No. 78,808, Jul. 28, 1987, abandoned.

[30] Foreign Application Priority Data

Aug. 6, 1986 [SE] Sweden .................................. 8603325

[51] Int. Cl.[4] ............................................. B23B 29/09
[52] U.S. Cl. ........................................ 82/160; 82/161; 407/102
[58] Field of Search ..................... 407/66; 82/160, 161

[56] References Cited

U.S. PATENT DOCUMENTS

| | | | |
|---|---|---|---|
| 3,425,305 | 2/1969 | Cocco | 82/36 B |
| 3,497,935 | 3/1970 | Bowling | 407/108 |
| 3,531,842 | 10/1970 | Bowling | 407/117 |
| 3,662,445 | 5/1972 | Whitaker | 407/117 |
| 3,775,818 | 12/1973 | Sirola | 407/117 |
| 4,270,422 | 6/1981 | Andersson | 82/36 B |
| 4,580,930 | 4/1986 | Zinner | 407/117 |

Primary Examiner—Frederick R. Schmidt
Assistant Examiner—Blynn Shideler
Attorney, Agent, or Firm—Burns, Doane, Swecker & Mathis

[57] ABSTRACT

The invention relates to a tool for chip removing machining and a blade therefor. The tool comprises a holder, an elongated blade and an insert. The holder is provided with an expandable securing part and a head having a longitudinally recess arranged to receive the blade. The blade has an insert site which receives the insert. The blade is provided to be wedged up in the holder in the longitudinal direction of the blade and in two directions perpendicular thereto.

20 Claims, 3 Drawing Sheets

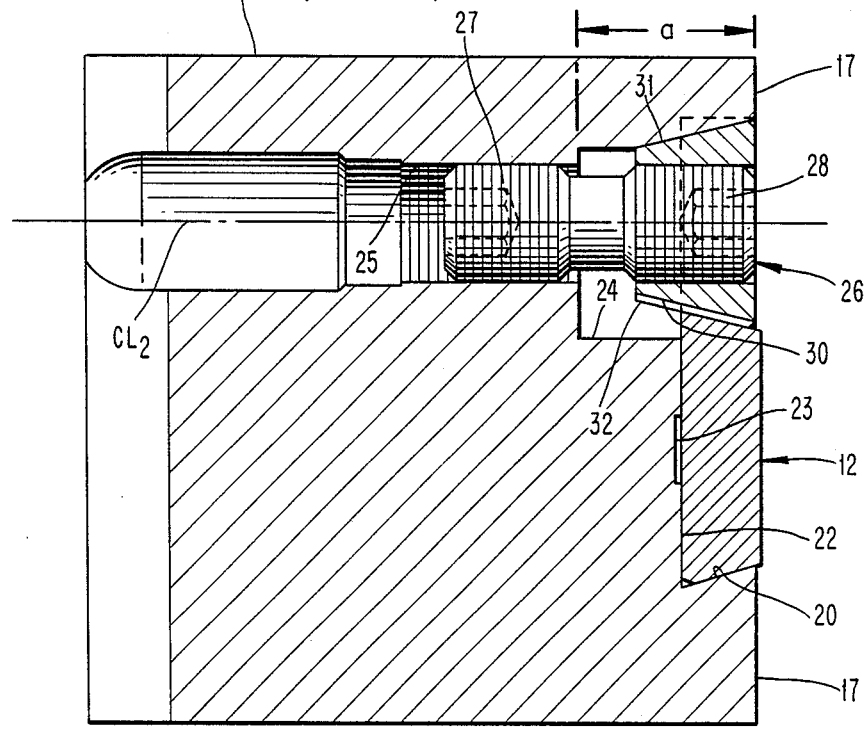
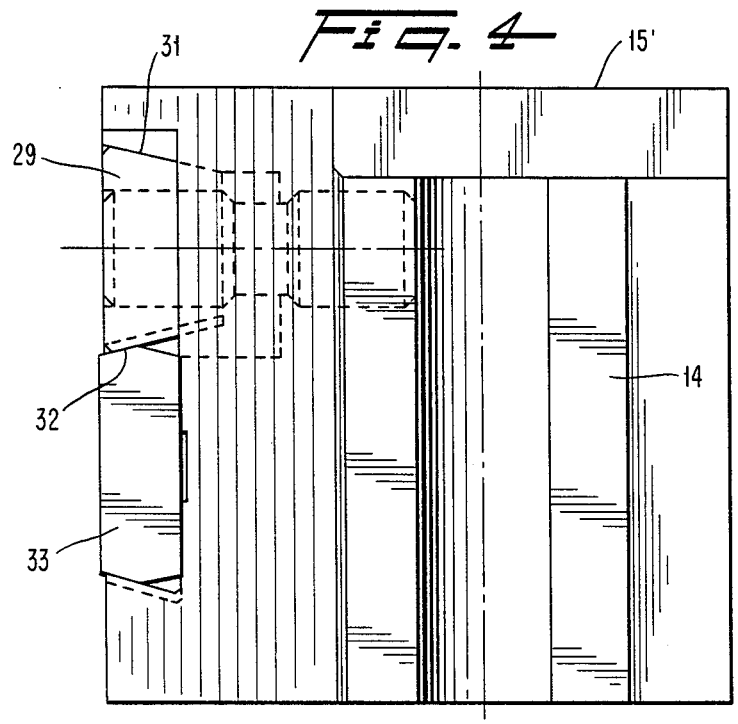

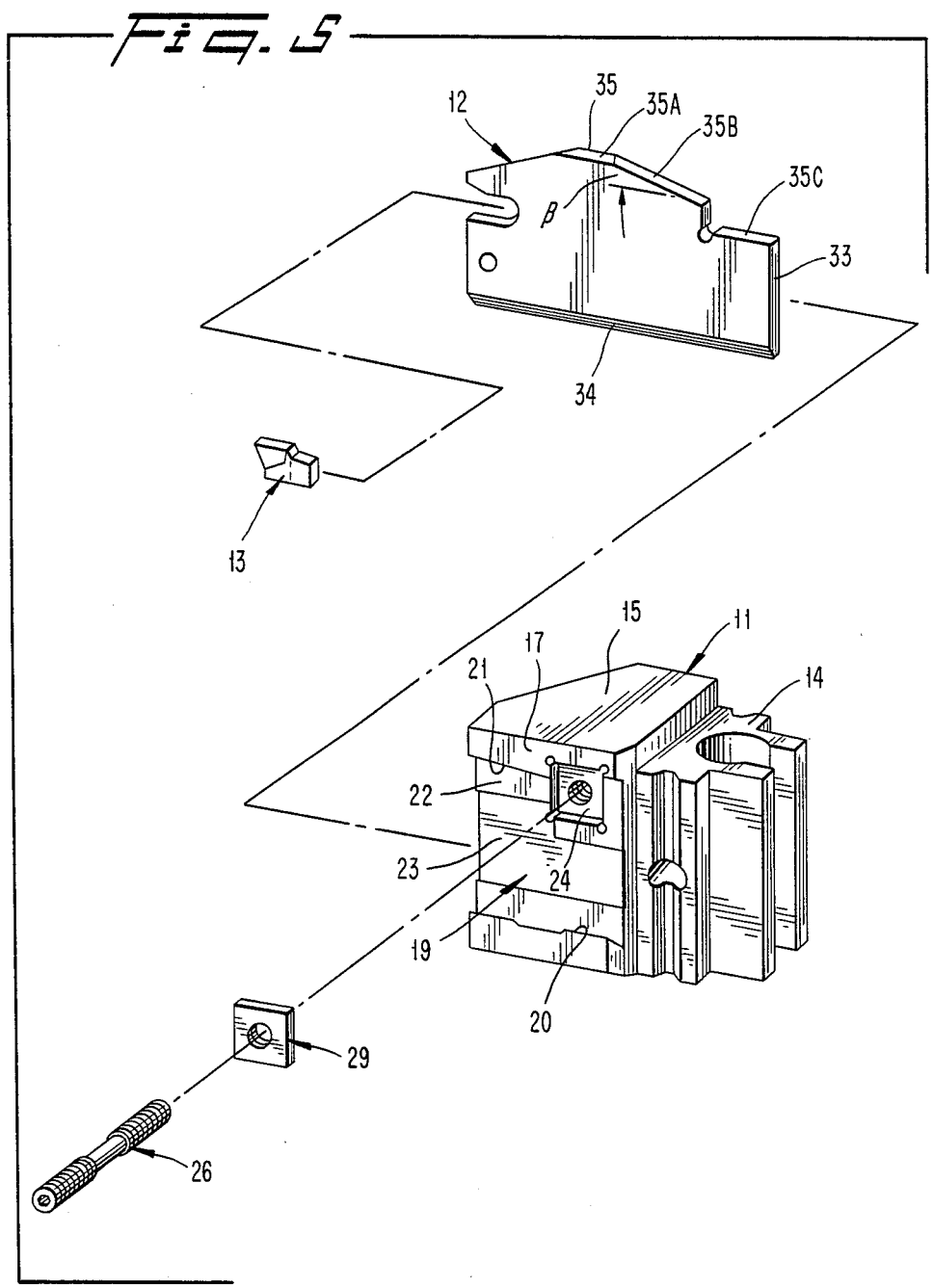

TOOL FOR CHIP REMOVING MACHINING

This application is a continuation of application Ser. No. 07/078,808, filed Jul. 28, 1987.

BACKGROUND AND OBJECTS OF THE INVENTION

The present invention relates to a tool for chip removing machining and a blade arranged therein. The tool comprises a holder, a planar, elongated blade and a cutting insert. The holder has an expandable securing part and a head attached thereto comprising a longitudinally extending first recess having bordering edge surfaces at least partly forming a dove-tail profile. The blade has a cutting insert site at a front surface thereof, an end surface, side surfaces and edge surfaces. The edge surfaces at least partly form a dove-tail profile. The blade is wedgingly urged towards a lower one of said bordering edge surfaces by means of tightening means.

In U.S. Pat. No. 3,775,818 is shown a parting tool comprising a holder, a blade and an insert. The holder is provided with a clamping device which is adapted to clamp the blade in a direction transverse to the longitudinal direction of the blade and to simultaneously clamp the insert. That type of tool lacks a well defined stop in the longitudinal direction of the blade and demands close tolerances on the holder and the blade such to avoid tilting in the holder and therefore the tool is adapted for small cutting forces only.

One object of the present invention is to shape a tool and a blade such to obtain a stable and secure tool system.

Another object is to obtain a flexible tool system, i.e., a tool wherein the blade is easily and quickly exchangeable regardless of the dimension thereof.

Another object is to obtain a tool system which is unsensitive to tolerance faults.

THE DRAWINGS

The invention will be more closely described hereinafter in connection with the appended drawings.

FIG. 3 shows a cross-section according to the line III—III in FIG. 1.

FIG. 4 shows an end view of the tool.

FIG. 5 shows an exploded view of the tool.

DESCRIPTION OF A PREFERRED EMBODIMENT OF THE INVENTION

Figure 1:
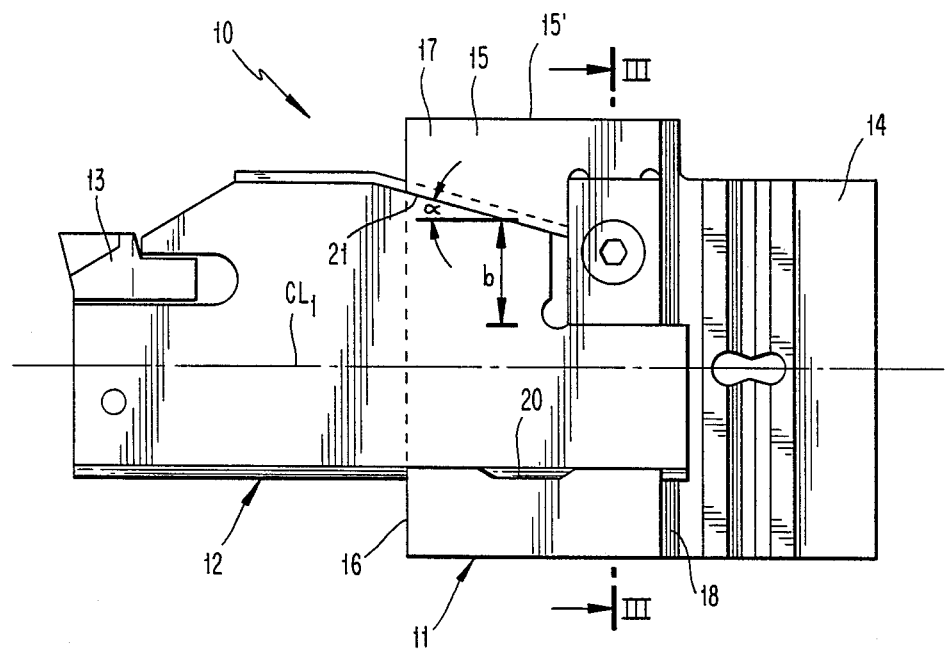
FIG. 1 shows a tool according to the invention in a side view.
Figure 2:
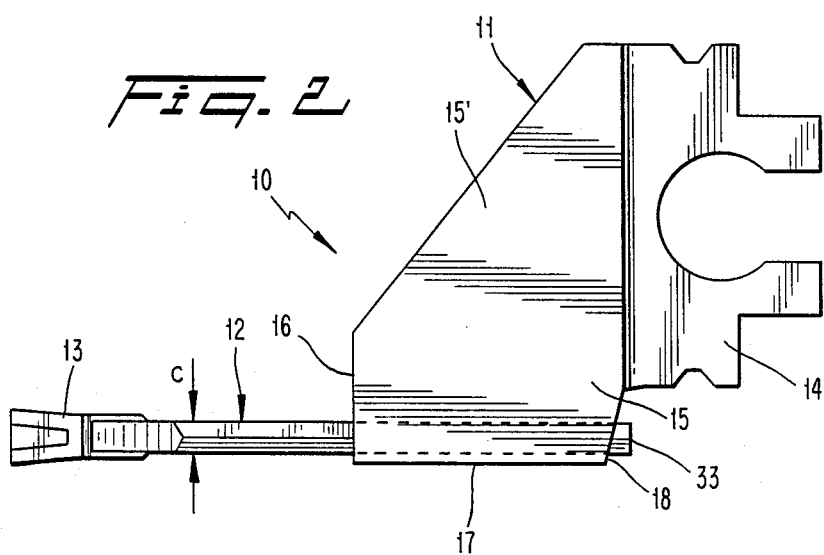
FIG. 2 shows the tool in a top view.

In the figures is shown a parting tool 10 for chip removing machining. The tool comprises a holder or adapter 11, a blade 12 and an insert 13.

The adapter has an, in itself previously known, expandable securing part 14 arranged to be clamped in a machine. The securing part is more closely described in U.S. Pat. No. 4,270,422 which is hereby incorporated in the description. The part 14 connects to a head 15 which extends forwardly and sidewardly relative to the part 14. The head has a planar upper side 15', a front surface 16, a side surface 17, an end surface 18, a lower side and a backed off surface.

A first recess 19 is formed in the head, which extends along the entire side surface 17 and terminates in the front surface 16 and the end surface. The recess 19 is bordered by two edge surfaces 20, 21 and a bottom 22. The edge surfaces 20, 21 form a dove-tail profile, i.e., they converge in a direction away from the inner or bottom wall 22. The enclosed angle is about 10 to 40 degrees. The lower edge surface 20 is mainly parallel with the center line CL of the tool 10. The upper edge surface 21 forms an acute angle $\alpha$ with the edge surface 20 in direction towards the securing part in the plane of the side surface 17, i.e. rearwardly. The angle $\alpha$ is chosen within the interval 10 to 20 degrees, preferably about 15 degrees. The edge surface 20 is preferably provided with a rear and a front lip for heel and toe abutment, respectively, for the blade. The bottom wall 22 is planarly shaped and has a groove 23 arranged along the entire length of the bottom. The groove 23 reduces the risk for tilting of the blade in the recess and may in certain cases be used for transference of cooling liquid.

A second recess 24 is formed in the head 15. The recess 24 is mainly square and terminates in the side surface 17 and in the recess 19. The recess 24 extends a distance a in the depth direction from the plane of the side surface 17. The distance a is at least twice the thickness c of the blade 12. The recess 24 is placed such that it is closer to the end surface 18 than to the front surface 16. The upper part of the recess 24, closest to the upper side 15', forms an internal acute angle with the upper side. The lower part of the recess, closest to the lower side of the head, is mainly parallel with the upper side 15'. Said parts of the recess are connected by two guiding surfaces which are mainly parallel with the plane of the front surface 16. The recess 24 has corners which are rounded off due to durability reasons. A bore 25 is formed in the head 15. The bore 25 is perpendicular to the plane of the side surface 17 and terminates in the middle of the recess 24 and in the backed off surface of the head. The bore is threaded from the recess 24 and a distance into the head whereafter it has been expanded to provide space for a key tool.

The threaded part of the bore 25 is arranged to receive one end of a stretching screw 26, i.e., a screw whose ends 27, 28 are threaded mutually opposite.

The second end 28 of the screw 26 will engage with a threaded bore in a wedge 29. The wedge 29 consists of two mainly planar and parallel side surfaces, two mainly planar and parallel guiding surfaces and two wedge surfaces 30, 31 converging towards the bore 25. The wedge surfaces converge towards a point on the center line $CL_2$. A lower wedge surface 30 is provided with transversely extending ridges 32 provided to reduce the tolerance sensitivity of the wedge. The corner portions of the wedge are chanfered. The upper wedge surface 31 is configured to engage with and to slide along the upper sloping part of the second recess 24. The thickness of the wedge is less than the depth a of the recess 24 but larger than the thickness c of the blade 12.

The blade 12 a plate having comprises two mainly plane-parallel side surfaces, a front surface, an end surface 33 and abutment two edge surfaces 34, 35. A cutting insert site in the form of a pocket is formed in the front end of the blade to receive an insert 13. The rear or shank portion of the blade is removably retained in the recess 19. The insert and the insert site are more closely described in the Swedish patent application Ser. No. 8601533-6, which is hereby incorporated with the description. The lower edge surface 34 is V-shaped and arranged parallel with the center line $CL_1$ of the tool. The upper edge surface 35 has a front section 35A oriented parallel with the centerline $CL_1$ while an intermediate section 35B forms an acute angle $\beta$ with the lower edge surface 34 in such a way that the section 35B converges rearwardly towards the edge surface 34 in direction towards the end surface 33. The angle $\beta$ is chosen within the interval 10 to 20 degrees, preferably about 15 degrees. The angle $\beta$ shall be about 0.5 degrees larger than the angle $\alpha$. The edge surface 35 includes a rear section 35C arranged mainly parallel with the edge surface 34. Also the upper edge surface 35 is roof-shaped in cross-section such that the outer portions of the edge surfaces 34, 35 facing away from the recess 19 form an acute angle with each other as can be seen in FIG. 4. The intermediate section 35C is in the height direction of the blade arranged at a distance b from the rear end of the first section 35B. The distance b is about 40 to 60 percent of the largest height of the blade. The section 35B merges into the section 35C via an edge perpendicular to the lower edge surface 34 and a rounded off corner. An imaginary extension line of the section 35B does not intersect the section 35C in any point but converges rearwardly towards an imaginary extension line of the section 35C.

When mounting the tool the ends 27, 28 of the screw 26 are threaded into the bore 25 of the head and into the bore of the wedge 29, respectively, without tightening too much. The wedge 29 is thereby in an open position. The blade 12, provided with an insert, is thereafter inserted from left in FIG. 1 and into the recess 19 in the head. The second section 35C of the blade may therefore slidingly pass the lower part of the wedge. As the enclosed angle $\alpha$ between the edge surfaces 20, 21 is less than the angle $\beta$ between the edge surface 34 and the second section 35B of the edge surface 35 the blade will be wedged up on the front part of the recess, i.e. at the intersections of the edge surfaces 20, 21 and the front surface 16, to define front contact regions with the border edges. In this position the wedge is tightened by the screw from one of the possible two directions whereby the upper part 31 of the wedge will contact with the upper part of the second recess 24 while the ridges 32 on the lower part 30 of the wedge will contact the second section 35C of the blade along rear contact regions and thus the blade will be forced downwardly towards the edge surface 20 and inwardly towards the bottom 22. Bending moment on the screw 26 is avoided by the surfaces 31 and 32 forming equal angles with the center line $CL_2$ of the bore 25, and therefore the screw will only be loaded with tensile stress.

The edge surface 21 in the intermediate recess and the first section 35B of the blade constitute axial stop means, i.e. prevent unwanted insertion of the blade into the first recess. The ridges 32 of the wedge 29 and the rear section 35C prevent tilting of the blade in the recess. The blade is thus wedged up in the holder in the longitudinal direction of the blade and in at least one direction perpendicular thereto, i.e. perpendicular to the side surface 17, at two spaced apart contact places. The contact places are defined by the front contact place between the surfaces 34, 35B and the surfaces 20, 21 and the other contact place is defined by the rear contact place between the surfaces 34, 35C and the ridges 32.

The invention thus relates to a tool for chip removing machining through which shape a flexible and stable tool system is obtained.

We claim:

1. In a tool for chip removal machining comprising a holder and a planar blade removably secured in said holder, said blade including a front site for receiving a cutting insert, the improvement wherein:

said holder comprises an expandable securing part and a head attached thereto, said head including a recess extending in a front-to-rear longitudinal direction, said recess comprising an inner wall and blade-engaging edge means including front-to-rear extending upper and lower border edges converging away from said inner wall to define a dove-tail profile as viewed in a cross-section of said recess, said blade being removably retained in said recess and comprising a one-piece plate extending in a front-to-rear longitudinal direction, said plate containing said insert-receiving site in the form of a pocket and comprising recess-engaging edge means including upper and lower abutment edges forming a dove-tail profile as viewed in a cross-section of said blade, said abutment edges contacting respective ones of said border edges to define therewith contact regions located adjacent front and rear ends of said border edges, said edge means of said blade and holder cooperating to define mutually engageable wedging surface means for applying against said blade:

first wedging forces in response to longitudinal rearward movement of said blade to positively limit said rearward movement of said blade, second wedging forces in the plane of said blade in a direction perpendicular to said longitudinal direction to force said blade firmly against said lower border edge, and third wedging forces in a direction perpendicular to the plane of said blade and perpendicular to said longitudinal direction to force said blade firmly against said inner wall of said recess, said holder including a movable wedge member including a surface defining a portion of one of said border edges, and together with said upper abutment edge applying said second wedging forces, said wedge member being movable relative to said recess in a direction substantially perpendicular to the plane of said plate and substantially perpendicular to said longitudinal direction.

2. Apparatus according to claim 1, wherein said upper and lower border edges include a first pair of upper and lower longitudinally rearwardly converging surfaces, and said upper and lower abutment edges including a second pair of upper and lower longitudinally rearwardly converging surfaces, said first and second pairs of surfaces applying said first wedging forces.

3. Apparatus according to claim 2, wherein said first pair of surfaces defines a first included angle therebetween, and said second pair of surfaces defines a second included angle therebetween, each of said first and second angles being acute, and said first acute angle being smaller than said second acute angle.

4. Apparatus according to claim 1, wherein said surface of said wedge member together with said upper abutment edge applying said third wedging force.

5. Apparatus according to claim 1, wherein said surface of said wedge member and a rear section of said upper abutment edge engaged thereby extend in a front-to-rear direction parallel to said longitudinal direction.

6. Apparatus according to claim 5, wherein a section of said upper border surface disposed forwardly of said rear section converges rearwardly relative to said lower border surface.

7. Apparatus according to claim 1, including threaded means for removably retaining said wedge member in place, said threaded means being rotatable about an axis extending perpendicular to the plane of said blade.

8. Apparatus according to claim 7, wherein said wedge member is intersected by the plane of said blade.

9. Apparatus according to claim 8, wherein said holder includes an additional recess communicating with said first-named recess, said wedge member disposed in said additional recess.

10. Apparatus according to claim 9, wherein said additional recess has a depth which is at least twice as great as the thickness of said blade, said wedge member having a thickness less than said depth of said additional recess and larger than said thickness of said blade.

11. Apparatus according to claim 8, wherein said wedge member has upper and lower surfaces diverging in a direction outwardly away from said holder, said upper and lower abutment edges converging in said direction outwardly away from said holder, and said lower border edge converging relative to said lower surface of said wedge member in said direction outwardly away from said holder.

12. Apparatus according to claim 11, wherein said upper and lower surfaces of said wedge member intersect said longitudinal rotary axis of said threaded means to form equal angles therewith.

13. Tool for chip removing machining comprising a holder, a planar, elongated blade and a cutting insert, said holder having an expandable securing part and a head attached thereto comprising a longitudinally extending first recess having bordering edge surfaces at least partly forming a dove-tail profile as viewed in a cross-section of said recess, said blade having a cutting insert site at a front surface thereof, an end surface, side surfaces and edge surfaces, said edge surfaces at least partly forming a dove-tail profile as viewed in a cross-section of said blade, said blade being wedgingly urged towards a lower one of said bordering edge surfaces by means of tightening means, the blade arranged to be wedged-up in the holder in the longitudinal direction of the blade and in two directions perpendicular thereto, said blade and holder comprising wedgingly cooperating first contact surfaces which are provided to determine the position of the blade in the longitudinal direction of the blade, wedgingly cooperating second contact surfaces which are provided to determine the position of the blade in the transverse direction of the blade parallel with the plane of the blade and wedgingly cooperating third contact surfaces provided to determine the position of the blade in the transverse direction of the blade normal to the plane of the blade, the head comprising a planar upper surface, a planar front surface, a side surface, an end surface, a lower surface and a backed off surface, the first recess extending along the side surface and terminating in the front surface and the end surface, said recess having a mainly planar bottom along which a groove extends, a second recess formed in the head which terminates in the bottom of the first recess and in the side surface, an upper part of said second recess facing away from the upper surface of the head, sloping and forming an acute angle with the upper surface, a threaded bore arranged perpendicularly to the side surface and terminating in the middle of the second recess, a screw received in said bore and disposed in threaded engagement with a wedge, said wedge having surfaces which form equal angles with the center line of the bore and said surfaces cooperating with the upper sloping part of the second recess and a second section of a second edge surface of a blade, respectively, in order to force one edge surface of the blade against one lower border surface of the first recess.

14. In a tool for chip removal machining comprising a holder and a planar blade removably secured in said holder, said blade including a front site for receiving a cutting insert, the improvement wherein:
said holder comprises an expandable securing part and a head attached thereto, said head including a recess extending in a front-to-rear longitudinal direction, said recess comprising an inner wall and blade-engaging edge means including front-to-rear extending upper and lower border edges converging away from said inner wall to define a dove-tail profile as viewed in a cross-section of said recess,
said blade being removably retained in said recess and comprising a one-piece plate extending in a front-to-rear longitudinal direction, said plate containing said insert-receiving site in the form of a pocket and comprising recess-engaging edge means including upper and lower abutment edges forming a dove-tail profile as viewed in a cross-section of said blade, said abutment edges contacting respective ones of said border edges to define therewith contact regions located adjacent front and rear ends of said border edges, said edge means of said blade and holder cooperating to define mutually engageable wedging surface means for applying against said blade:
first wedging forces in response to longitudinal rearward movement of said blade to positively limit said rearward movement of said blade,
second wedging forces in the plane of said blade in a direction perpendicular to said longitudinal direction to force said blade firmly against said lower border edge, and
third wedging forces in a direction perpendicular to the plane of said blade and perpendicular to said longitudinal direction to force said blade firmly against said inner wall of said recess,
said upper and lower border edges including a first pair of upper and lower longitudinally rearwardly converging surfaces, and said upper and lower abutment edges including a second pair of upper and lower longitudinally rearwardly converging surfaces, said first and second pairs of surfaces applying said first wedging forces,
said first pair of surfaces defining a first included angle therebetween, and said second pair of surfaces defines a second included angle therebetween, each of said first and second angles being acute, and said first acute angle being smaller than said second acute angle.

15. Apparatus according to claim 14, wherein said first and second acute angles are from 10 to 20 degrees, said second angle being about 0.5 degrees larger than said first angle.

16. In a tool for chip removal machining comprising a holder and a planar blade removably secured in said holder, said blade including a front site for receiving a cutting insert, the improvement wherein:
said holder comprises an expandable securing part and a head attached thereto, said head including a recess extending in a front-to-rear longitudinal direction, said recess including blade-engaging edge means including front-to-rear extending upper and lower border edges defining a dove-tail profile as viewed in a cross-section of said recess, and said blade being removably retained in said recess and including a shank portion extending in a front-to-rear longitudinal direction, said shank portion comprising recess-engaging edge means including upper and lower abutment edges forming a dove-tail profile as viewed in a cross-section of said blade, said abutment edges engaging respective ones of said border edges, said edge means of said blade and holder cooperating to define mutually engageable wedging surface means for applying against said blade:

first wedging forces in response to longitudinal rearward movement of said blade to positively limit said rearward movement of said blade, second wedging forces in the plane of said blade in a direction perpendicular to said longitudinal direction to force said blade firmly against said lower border edge, and third wedging forces in a direction perpendicular to the plane of said blade and perpendicular to said longitudinal direction to force said blade firmly against said bottom surface of said recess, said holder including a removable wedge member having a surface which defines a portion of one of said border edges, and which together with said upper abutment edge applies said second wedging forces, and threaded means arranged for removably retaining said wedge member in place, said threaded means being rotatable about an axis extending perpendicular to the plane of said blade.

17. A holder adapted to carry a blade, said holder comprising an expandable securing part and a head attached thereto, said head including a recess extending in a front-to-rear longitudinal direction, said recess including blade-engaging edge means including front-to-rear extending upper and lower border edges defining a dove-tail profile as viewed in a cross-section of said recess, said recess including an inner wall, said upper and lower border edges converging in a direction away from said inner wall, said upper border edge including first and second sections, said first section converging rearwardly relative to the lower border edge to form an acute angle therewith, said second section disposed rearwardly of said first section and extending substantially parallel to said lower border edge, said second section being defined by a wedge member which is movable relative to said head in a lateral direction substantially perpendicular to said longitudinal direction and substantially perpendicular to said inner wall, and a threaded retainer for adjustably securing said wedge member to said head, said threaded retainer extending through said wedge member in said lateral direction.

18. Apparatus according to claim 17, wherein said head includes a side surface, said recess formed in said side surface so as to be open in a direction perpendicular to said side surface, said recess including a bottom wall disposed parallel to said side surface, a front-to-rear extending groove formed in said bottom wall.

19. Apparatus according to claim 17, wherein said head includes an additional recess formed in said first-named recess, said member comprising a wedge formed in said additional recess, said wedge being movable perpendicularly relative to said side surface.

20. Apparatus according to claim 19 including a screw for securing said wedge to said head, said screw being rotatable about an axis disposed perpendicular to said side surface.

* * * * *